June 13, 1961 M. E. DAVIES 2,988,396
CORE HANDLING DEVICE
Filed Jan. 21, 1959 2 Sheets-Sheet 1

INVENTOR.
MARK E. DAVIES.
BY Robert O. Richardson
ATTORNEY.

June 13, 1961 M. E. DAVIES 2,988,396
CORE HANDLING DEVICE
Filed Jan. 21, 1959 2 Sheets-Sheet 2
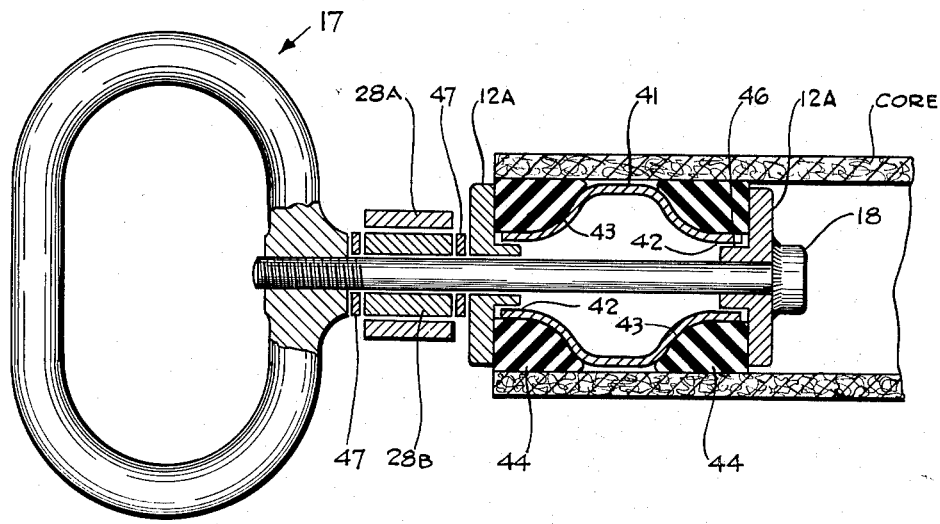
Fig_4
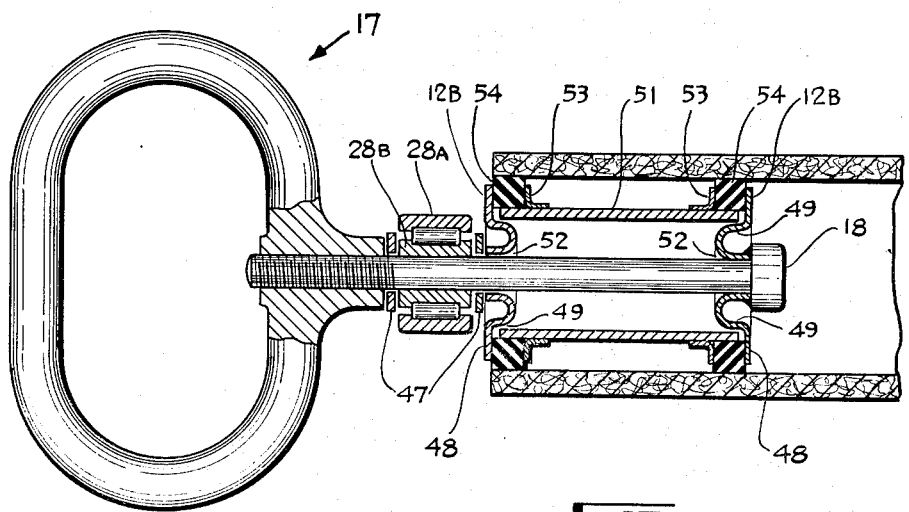
Fig_5
INVENTOR.
MARK E. DAVIES.
BY Robert O. Richardson
ATTORNEY

United States Patent Office 2,988,396
Patented June 13, 1961

2,988,396
CORE HANDLING DEVICE
Mark E. Davies, Brea, Calif.
(1807 Raymond Ave., Anaheim, Calif.)
Filed Jan. 21, 1959, Ser. No. 788,217
3 Claims. (Cl. 294—93)

This invention relates to a core handling device and more particularly to a core handling device which extends into the core and expands outwardly against the inner walls of the core to secure the device to the core.

Heretofore devices have been used which are insertable into cylindrical objects and which are adapted to expand outwardly to grip the object. However, these devices have used complex linkages, camming actions, and extensive use of precision machine parts, all of which add to the cost and subtract from the durability and reliability of the device. In addition, these devices required gripping surfaces, which frictionally gripped the walls of the object, often piercing, denting or otherwise distorting the shape of the object, rendering it substantially worthless after repeated usage.

The core handling device comprising the present invention consists of a handle which may be attached axially at the end of a cylindrical object or core by insertion into the core of a resilient outwardly expandable element which maintains the handle in position by frictional contact with the core inner wall. This element expands outwardly upon axial compression and contracts back to its normal position upon release of axial pressure. The axial pressure is acquired by a simple threaded nut and shaft arrangement which may be inexpensively constructed, has few parts, and which is reliable and easy to operate.

The core handling device comprising the present invention is especially useful in the carpet industry although of course its adaptability to other industries will become readily apparent as its description proceeds and its utility is explained. In the carpet industry rugs are rolled on long hollow fibre or cardboard cylinders, the inner diameters of which have now been standardized at three inches. Until the present invention was conceived, these huge rolls of carpeting had to be manually carried into and out of trucks, box cars, and delivery trucks. Due to thier bulk and weight this was a clumsy and difficult task, requiring several workmen working in close cooperation with each other and often in crowded and cramped quarters. In warehouses and store display areas the rugs usually had to be transferred from these rug cores to special pipe racks, requiring additional rug handling.

The time consuming and burdensome task of rug handling, moving and storage has been reduced to a minimum through use of the core handling device comprising the present invention. This device consists of a handle at the end of the rug core for the workmen to use in moving the rug. Bearing means is provided for unrolling the rug after it has been mounted on a suitable rack for display purposes. This handle and roller is maintained in position by an expansible inner wall gripping member affixed thereto. This gripping member includes a wall contacting element of resilient deformable material which enlarges outwardly upon axial compression. This material further maintains a frictional grip on the core walls to prevent axial slippage. By circumferentially gripping of the walls, the handle is centrally positioned at all times and may be used without thought of rotation to a specific position.

It is therefore an object of the present invention to provide for an improved core handling device.

Another object is the provision of a handle and bearing means at the end of a rug handling core.

Another object is the provision of a core handling device that does not require expensive and complicated components.

Another object is the provision of a core handling device which may be easily fabricated and assembled, yet which is extremely rugged and reliable in operation.

Other objects and features of the present invention will be readily apparent to those skilled in the art from the following specification and appended drawings wherein is illustrated a preferred form of the invention and in which:

FIGURE 4 is a cross-sectional view of different embodiment of the present invention showing a modification of the insertable portion; and FIGURE 5 is a cross-sectional view showing still another modification of the insertable portion.

Figure 1:
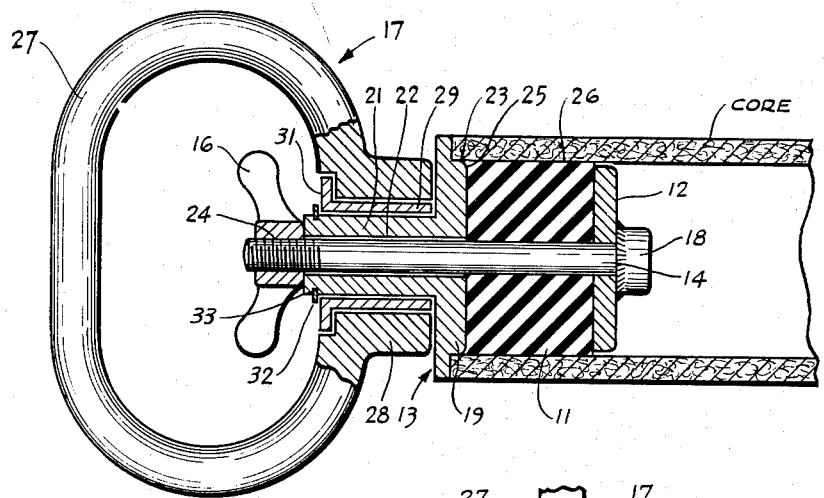
FIGURE 1 is a cross-sectional view of a preferred embodiment of the present invention particularly suited to the rug industry.

Referring now to FIGURE 1, the core handling device shown consists of a core wall engaging portion 11, inner end plate 12, mandrel 13, a connecting member 14, wing nut 16 and a combination handle and bearing means 17. The wall engaging portion consists of a roller 11 of slightly less than three inches in diameter and is made from a resilient deformable non-compressible material such as neoprene or rubber, for example. This material preferably has the characteristics of maximum expansion, long life and the ability to withstand oxidation. A material having a Shore hardness of about 30 has been found satisfactory in this application. A 3″ roll one inch long which when compressed axially ¼″, will result in a 3$^{15}\!/_{32}$″ diameter is considered to have a satisfactory performance.

Inner end plate 12 consists of a disc or washer slightly less than 3″ in diameter. An opening in the center is for insertion of the connecting member 14 with its retaining head 18. This head is preferably non-rotatably secured to plate 12, such as by welding, so that connecting member 14 will not tend to rotate with the wing nut 16 during axial compression and release. Plate 12 becomes non-rotatable through frictional contact with the resilient material 11.

The outer end portion or mandrel 13 consists of a circular plate 19 and an outwardly extending stem 21 protruding from the center of the outer face of plate 19. A bore 22 extends through the axis of the mandrel 13 to accommodate the connecting member 14. The inner face of plate 19 has a recess 23 about its periphery to receive the end of a core when the device is positioned for use. This recess provides support for the end of the core to maintain the core handling device in axial alignment. Recess 23 has a small bevelled, rounded or tapered edge 25 to permit easier insertion if the core should be slightly bent or out of round. It also provides space for slight outwardly directed axial movement of roller 11 for additional wedging action when the roller is expanded outwardly. The outer end 24 of connecting member 14 is threaded to receive wing nut 16. Tightening the wing nut narrows the spacing between plates 12 and 19 and axially compresses roller 11. Since the roller 11 sandwiched therebetween is a resilient, deformable, non-compressible material it must flow into the only space available, i.e., outwardly into frictional engagement with the inner surface 26 of the core.

An oval shaped handle ring 27 terminates on opposed sides of bearing member 28 which is rotatably mounted on stem 21. This bearing member 28 is cylindrical shaped with the handle ring 27 integrally connected to its outer circumference as shown. A bushing 29 with an outer outwardly projecting collar 31 is inserted over the stem 21. An expansion spring 32 in groove 33 on the stem prevents accidental disassembly.

In operation the device is inserted into the end of the core which abuts recess 23 and wing nut 16 is tightened to compress the roller 11 between plates 12 and 19. The greater the axial compression, the greater is the outward expansion of the roller against the core wall. After the device is thus secured, a workman may use the handle ring 27 to pull, or lift and carry the rug in piling, unpiling, transferring into or out of a boxcar or delivery truck or onto or off of a display rack. The weight of the rug is borne by recess 23 of outer end 24 and inner plate 12 as well as roller 11 against the core inner surface 26.

Because of the increased strength of rug cores due to modern advances in technology, the rug no longer need be transferred to another core for display as formerly. The original packing and shipping core is now useful until the rug material has been completely used and the core may then be sent back to the factory for reuse. The display racks usually have Y or U shaped brackets at each end which may be adapted to receive bearing member 28. The rug may then be conveniently rolled out for display and rolled up again with a minimum of effort.

The core handling device may be removed from the core easily and without damage by simply rotating the wing nut 16 in the opposite direction to increase the spacing between end plates 12, 19. This permits the resiliency of the roller to return itself to its original shape, elongating itself axially and reducing its circumference. The device may then be withdrawn from the core.

Figure 2:
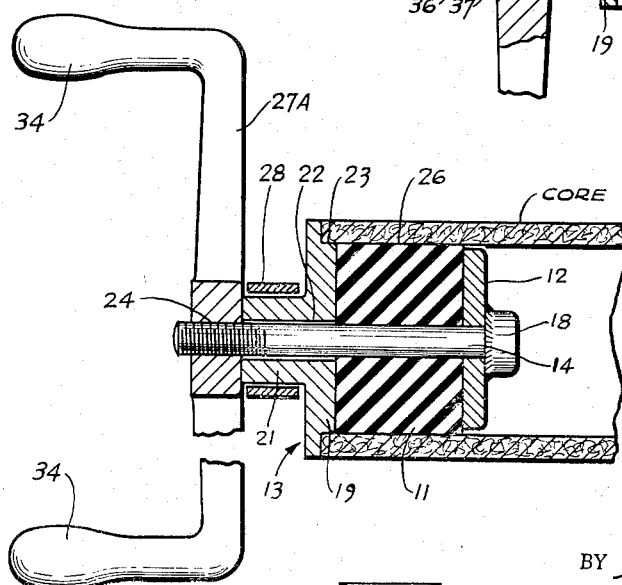
FIGURE 2 is a cross-sectional view illustrating a modification in the handle mechanism of FIGURE 1.

The principle of operation of the other embodiments of the invention is substantially the same. Accordingly, only differences in structure need be discussed. Like or similar numerals are used to identify like or similar parts. In FIGURE 2 a rotatable bearing member 28A is mounted over stem 21 and is adapted to engage suitable brackets on a display rack. In this embodiment the handle 27A has a central threaded aperture to receive the threaded end 24 of connecting member 14. This handle may have hand engageable ends 34 as shown or it may have a handle ring as shown at 27 in FIGURE 1 if desired. If a handle ring is used, the handle portion may pivot relative to the threaded aperture portion so as to hang downwardly when not used. As the handle is rotated the roller 11 may be axially compressed and radially expanded into contact with the core. This provides greater compression and is perhaps more easily operated than the embodiment shown in FIGURE 1 and therefore may be preferable in some cases.

Figure 3:
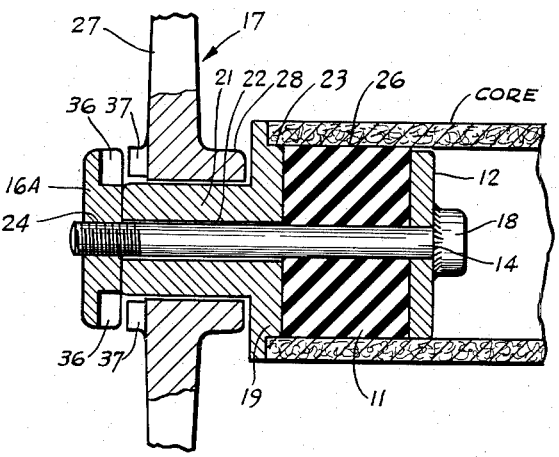
FIGURE 3 is a cross-sectional view showing a still further modification of the handle and bearing mechanism of FIGURE 1.

The embodiment shown in FIGURE 3 has a handle and bearing means 17 similar to that shown in FIGURE 1. Stem 21, plates 12 and 19, and connecting member 14 are also similar. Retaining nut 16A has two slots 36 therein adapted to receive the outwardly projecting male prongs 37 extending from handle 17. In operation the handle 17 is moved axially outwardly to engage the prongs 37 into slots 36. Then upon rotation of handle 17, nut 16A may be rotated to engage or disengage roller 11 with the core. Inward axial movement of handle 17 frees prongs 37 from engagement with slots 36 to permit handle and bearing rotation relative to stem 21. Thus the embodiment in FIGURE 3 combines the advantage of greater compressive forces found in FIGURE 2 with the freedom of handle rotation found in FIGURE 1.

The embodiment shown in FIGURE 4 illustrates a modification of the insertable portion. Here a cylinder 41 is formed with maximum middle diameter and reduced neck portions 42 with interconnecting shoulders 43. Inserted over the reduced neck portions and abutting the shoulders are mounted resilient collars 44 of deformable material which extend axially beyond the ends of the neck portions 42. Inner and outer plate members 12A are alike, having axially inwardly extending guide portions 46 insertable within the neck portions 42. These plate members are axially apertured to receive connecting member 14 whose head 18 is non-rotatably connected to the inner plate.

A roller or ball bearing member 28A is mounted over the outer end of connecting member 14 between spacers 47. The outer surface is the bearing member which is rotatable relative to the inner portion 28B. When the outer threaded member (wing nut or handle) is rotated, the axial compressive force is transmitted through the inner bearing portion 28B and spacers 47 to the outer end plate 12A. When axially compressed, the end plates 12A axially compress the resilient collars 44 against shoulders 43, causing outward expansion. Since the two collars are axially spaced within the core, the handle is securely positioned for maneuvering of the core.

In FIGURE 5 there is shown a further modification of the insertable portion. Here symmetrical end plates 12B are stamped and formed from sheet metal in a manner to give maximum strength. The outer rim 48 is substantially flat and then is inwardly depressed at 49 to form a centering guide for seating connecting cylinder 51. The plate then extends outwardly again at its center 52. Cylinder 51 rides on the end plate centering guides 49 when the plates are moved inwardly. Adjacent the ends of cylinder 51 are mounted outwardly extending collar rings 53 against which abut the core contacting resilient deformable collars 54. As the plates 12B move inwardly upon rotation of the threaded member (wing nut or handle), they axially compress the collars against the collar rings 53 and thus cause outward expansion of the collars against the inner surface of the core wall. Here again the spaced core contacting collars 54 firmly secure the handle to the end of the core for maneuvering.

While the described embodiment has been in reference to and finds its greatest present utility in the carpet industry, this was for the purpose of illustration only. Any cylindrical body can be handled by application of the instant invention, so long as the cross-sectional dimensions of the inserted portion are made to conform to the cross-sectional area defined by the inner surface of the object to be handled. Hence, while the embodiment described referred to a right circular cylinder, any type of enclosed or partially enclosed cylindrical object can be handled using the disclosed prancples.

It is therefore understood that the invention is not limited to the preferred embodiments specifically disclosed, as many variations and equivalents may be included as may readily appear to those skilled in the art and within the scope of the appended claims.

I claim:
1. A core handling device comprising a mounting means insertable within the end of a tubular core and a handle and bearing means positionable externally of said core to permit rotation of said core when said bearing means is supported horizontally by a support means, said mounting means comprising a resilient deformable member, means for radially expanding said member into engagement with the inner wall of said core comprising a pair of end plates positioned one at each end of said member and interconnecting means for moving said plates relative to each other, said interconnecting means having a threaded portion extending outwardly from one of said plates, a member having a threaded aperture engageable with said threaded portion, one of said plates having a stem extending axially outwardly from one side thereof and a recess extending about the periphery on the other side of the plate to receive the end of a core when the device is positioned for use, said handle and bearing means being mounted on said stem for axial rotation thereon.

2. A core handling device comprising a mounting means insertable within the end of a tubular core and a handle and bearing means positionable externally of said core to permit rotation of said core when said bearing means is supported horizontally by a support means, said mounting means comprising a resilient deformable member, means for radially expanding said member into engagement with the inner wall of said core comprising a pair of end plates positioned one at each end of said member and interconnecting means for moving said plates relative to each other, said interconnecting means having a threaded portion extending outwardly from one of said plates, said handle having a threaded aperture engageable with said threaded portion, one of said plates having a stem extending axially outwardly from one side thereof and a recess extending about the periphery on the other side of the plate to receive the end of a core when the device is positioned for use, said bearing means being mounted on said stem for axial rotation thereon.

3. A handle with mounting means insertable within the end of a tubular core, said mounting means comprising a resilient deformable member, means for radially expanding said member comprising a pair of end plates positioned at either end of said member and interconnecting means for moving said plates relative to each other, one of said plates having means thereon for rotatably mounting said handle exteriorly of said core to permit said handle to rotate about the axis of said core, said interconnecting means including a connecting means between said plates and a threaded portion extending outwardly from one of said plates, a threaded nut member rotatably engageable with said threaded portion, said handle having means thereon for selectively engaging and disengaging said nut member, whereby rotation of said handle imparts rotation to said nut member to vary the spacing between said plates as desired.

References Cited in the file of this patent

UNITED STATES PATENTS

| | | |
|---|---|---|
| 812,214 | Law et al. | Feb. 13, 1906 |
| 922,544 | Turner et al. | May 25, 1909 |
| 966,748 | Honecker | Aug. 9, 1910 |
| 1,203,586 | Cowles | Nov. 7, 1916 |
| 1,808,411 | Hinkston | June 2, 1931 |
| 2,493,452 | Grigg | Jan. 3, 1950 |
| 2,538,693 | Maisch | Jan. 16, 1951 |
| 2,604,170 | Leffler | July 22, 1952 |
| 2,604,225 | Armstrong | July 22, 1952 |
| 2,607,370 | Anderson | Aug. 19, 1952 |
| 2,738,192 | Wells | Mar. 13, 1956 |
| 2,787,492 | Gisser et al. | Apr. 2, 1957 |
| 2,826,445 | Tidland | Mar. 11, 1958 |